US008657129B2

(12) United States Patent
Marks et al.

(10) Patent No.: US 8,657,129 B2
(45) Date of Patent: Feb. 25, 2014

(54) DRUM RACK

(75) Inventors: Jonathan A. Marks, Summerville, MA (US); David A. McDonald, Merrimack, NH (US); John V. Roderick, Marshfield, MA (US)

(73) Assignee: Avedis Zildjian Co., Norwell, MA (US)

( * ) Notice: Subject to any disclaimer, the term of this patent is extended or adjusted under 35 U.S.C. 154(b) by 286 days.

(21) Appl. No.: 12/962,408

(22) Filed: Dec. 7, 2010

(65) Prior Publication Data

US 2012/0138558 A1 Jun. 7, 2012

(51) Int. Cl.
*G01G 5/00* (2006.01)
*A47F 7/00* (2006.01)

(52) U.S. Cl.
USPC .......................................... 211/85.6; 211/195

(58) Field of Classification Search
USPC ........ 211/85.6, 182, 195, 201, 204, 206, 200; 248/150, 166; 403/65, 84, 86, 91, 101
See application file for complete search history.

(56) References Cited

U.S. PATENT DOCUMENTS

| | | | | | |
|---|---|---|---|---|---|
| 982,302 | A | * | 1/1911 | Roncaglia | 248/166 |
| 1,376,593 | A | * | 5/1921 | Tuttle | 219/532 |
| 3,073,414 | A | * | 1/1963 | Lavrard | 182/164 |
| 3,612,585 | A | * | 10/1971 | Mayr | 403/264 |
| 3,945,291 | A | * | 3/1976 | Zickos | 84/421 |
| 4,036,462 | A | * | 7/1977 | Sheftel | 248/166 |
| 4,248,129 | A | | 2/1981 | Zildjian | |
| 4,579,229 | A | * | 4/1986 | Porcaro et al. | 211/85.6 |
| 5,125,134 | A | | 6/1992 | Morita | |
| 5,182,416 | A | * | 1/1993 | Schweizer | 84/723 |
| 5,459,283 | A | | 10/1995 | Birdwell, Jr. | |
| 5,520,292 | A | * | 5/1996 | Lombardi | 211/85.6 |
| 6,093,878 | A | | 7/2000 | Hoshino | |
| 6,223,917 | B1 | * | 5/2001 | Bruder | 211/189 |
| 6,252,967 | B1 | | 6/2001 | Moore et al. | |
| 6,281,417 | B1 | * | 8/2001 | Ladao | 84/327 |
| 6,382,434 | B1 | * | 5/2002 | Silberg | 211/195 |
| 6,471,078 | B2 | * | 10/2002 | Pyle | 211/85.6 |
| 6,610,916 | B1 | * | 8/2003 | Torrez | 84/421 |
| 6,634,304 | B2 | * | 10/2003 | Wang | 108/129 |
| 6,682,253 | B2 | * | 1/2004 | Binna et al. | 403/263 |
| 6,835,887 | B2 | | 12/2004 | Devecka | |
| 7,377,504 | B2 | * | 5/2008 | Houldsworth | 269/296 |
| 7,488,887 | B2 | | 2/2009 | Mori | |

(Continued)

FOREIGN PATENT DOCUMENTS

| | | |
|---|---|---|
| JP | H11-184459 A | 7/1999 |
| JP | 2009-251477 A | 10/2009 |

OTHER PUBLICATIONS

International Search Report and Written Opinion in PCT Application No. PCT/US2011/062959, mailed Apr. 4, 2012.

(Continued)

*Primary Examiner* — Jennifer E Novosad
(74) *Attorney, Agent, or Firm* — Nixon Peabody LLP; Khaled Shami

(57) ABSTRACT

A foldable rack includes at least two segments rotatably coupled to one another such that the foldable rack can achieve a folded configuration and an operational configuration, the folded configuration being more compact than the operational position. The rack can be configured to support musical instruments such as cymbals, drums and the like and provide for adjustability of their positions while maintaining a clear and uncluttered appearance by concealing any electrical cabling involved.

26 Claims, 13 Drawing Sheets

(56) References Cited

U.S. PATENT DOCUMENTS

| | | | |
|---|---|---|---|
| 7,589,275 B2 | 9/2009 | Arimoto | |
| 7,608,771 B2 | 10/2009 | Fournier et al. | |
| 7,667,130 B2 | 2/2010 | Mishima | |
| 7,838,753 B2 | 11/2010 | Steele | |
| 7,851,687 B2 | 12/2010 | Chang et al. | |
| 7,928,304 B2 * | 4/2011 | Eason et al. | 84/421 |
| 8,063,296 B2 | 11/2011 | Copeland et al. | |
| 8,186,367 B1 * | 5/2012 | Le Tran et al. | 135/67 |
| 2001/0004969 A1 * | 6/2001 | Arai | 206/320 |
| 2002/0018573 A1 | 2/2002 | Schwartz | |
| 2003/0221545 A1 | 12/2003 | Tomoda | |
| 2004/0104189 A1 * | 6/2004 | Yu | 211/195 |
| 2005/0126373 A1 | 6/2005 | Ludwig | |
| 2005/0145101 A1 | 7/2005 | Yoshino | |
| 2008/0163739 A1 | 7/2008 | Mod | |
| 2009/0007754 A1 | 1/2009 | May | |
| 2009/0179522 A1 | 7/2009 | Cappello et al. | |
| 2009/0225021 A1 | 9/2009 | Ye et al. | |
| 2010/0102011 A1 * | 4/2010 | Blum | 211/8 |
| 2010/0177516 A1 | 7/2010 | Chang et al. | |
| 2010/0180750 A1 | 7/2010 | Steele | |
| 2012/0060669 A1 | 3/2012 | Ryan et al. | |
| 2012/0060670 A1 | 3/2012 | Truchsess | |
| 2012/0144980 A1 | 6/2012 | Roderick et al. | |
| 2012/0186419 A1 | 7/2012 | Roderick et al. | |

OTHER PUBLICATIONS

Office Action in U.S. Appl. No. 12/966,965, mailed Dec. 23, 2011.

Office Action in U.S. Appl. No. 12/966,965, mailed Jun. 22, 2012.

Office Action in U.S. Appl. No. 13/436,683, mailed May 29, 2012.

Korean Patent Application No. 2008-242123, filed Sep. 22, 2008. English translation.

Korean Patent Application No. 2008-312097, filed Dec. 8, 2008. English translation.

"Traps Drums, Portable Acoustic and Electronic Drums," retrieved from www.trapsdrumsusa.com, Apr. 2010.

International Search Report and Written Opinion in PCT/US2011/051798 mailed Jan. 17, 2012.

International Search Report and Written Opinion in PCT/US2011/062964, mailed Jan. 17, 2012.

International Search Report and Written Opinion in PCT/US2011/051810, mailed Jan. 17, 2012.

* cited by examiner

DRUM RACK

TECHNICAL FIELD

The present disclosure relates generally to stands or racks for supporting musical instruments and the like, and more particularly, to a rack for supporting drums and other percussion instruments.

BACKGROUND

Musical instrument supports are well known. Drum and percussion instrument supports are also known. However, these have traditionally been bulky and unwieldy, and, when in use, tend to exacerbate a cluttered appearance of the stage or location at which they are erected, particularly when used with electronic instruments and pickups that have electrical wires extending from the instruments to various electronic equipment.

OVERVIEW

As described herein, a foldable rack includes at least two segments rotatably coupled to one another such that the foldable rack can achieve a folded configuration and an operational configuration, the folded configuration being more compact than the operational position.

Also as described herein, a foldable rack includes first and second segments, at least one of which includes at least one side channel configured to constrain motion of a first fastener part in all but one degree of freedom, a hinge rotatably coupling the first and second segments between a folded configuration and an open configuration, and a plurality of legs configured to support the first and second and second segments in the open configuration.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a percussion instrument rack, such as that used to support drums, snares, cymbals and the like. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The term "exemplary" is used exclusively herein to mean "serving as an example, instance or illustration." Any embodiment described herein as "exemplary" is not necessarily to be construed as preferred or advantageous over other embodiments.

Figure 1A:
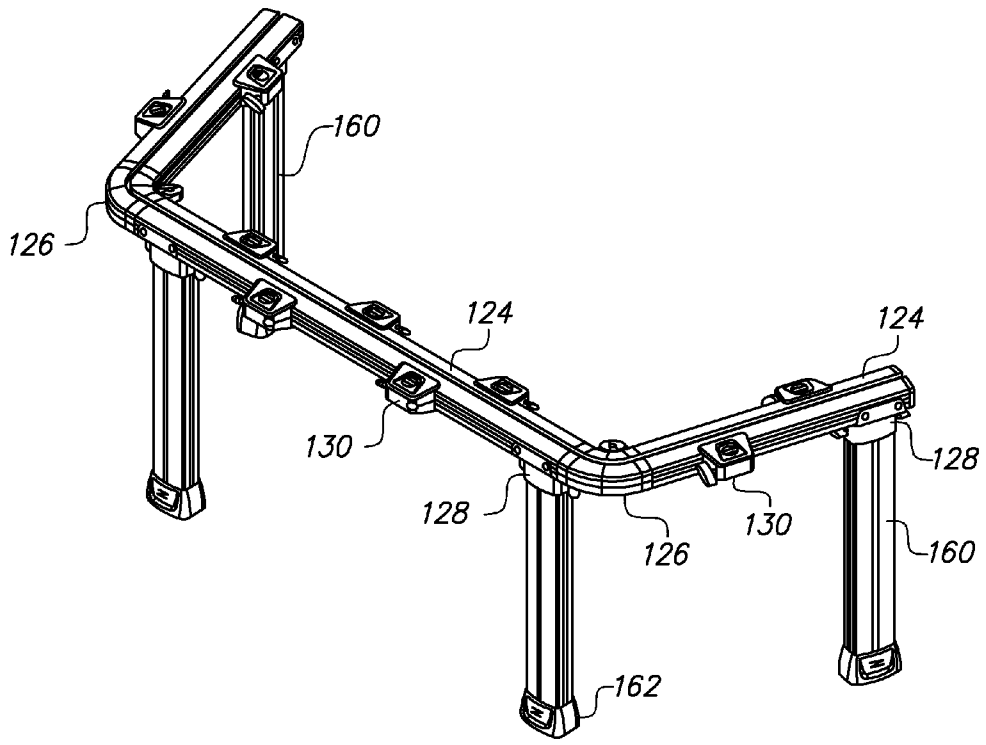
FIG. 1A is an isometric view of a musical instrument support rack 100 in an open configuration.

FIG. 1A is an isometric view of a musical instrument support rack 100 for particular use with drums, snares, cymbals and the like. Rack 100 is shown in FIG. 1A in the open or operational configuration, and includes generally a horizontal support rail 120 having multiple segments, and a plurality of releasably securable legs 160 supporting the support rail above the ground (not shown). In the embodiment shown, the number of legs 160 is four, although this number can vary.

Figure 1B:
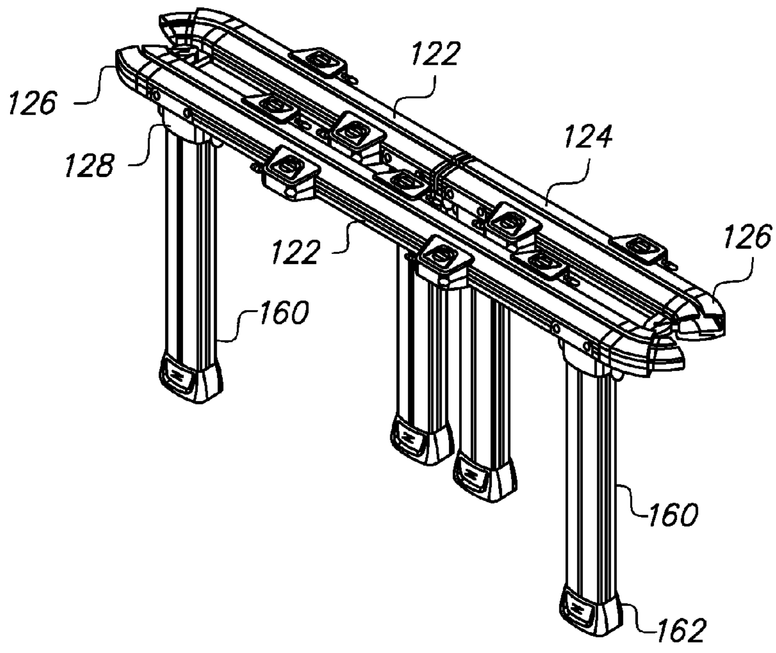
FIG. 1B is an isometric view of the rack 100 in the folded configuration.

Support rail 120 is generally comprised of multiple segments, some or all of which are articulated and are rotatably coupled to one another, including a main segment 122 and two shorter sub-segments, 124L and 124R (124 collectively), attached at the opposite ends of the main segment. The attachment of segments to one another is by means of hinges 126 that are rotatable in one degree of freedom to permit the sub-segments 124 to be folded in towards the main segment 122 to achieve, at one extreme, a compact configuration in which the sub-segments fold up against the main segment substantially parallel thereto. Such a folded configuration is shown in FIG. 1B. At the other extreme (FIG. 1A), the hinges 126 allow rotation of the sub-segments to the fully open configuration, to an angle of between about 90° and 180°, but preferably about 110°, to ensure stability during use. It will be appreciated that the number of segments is not restricted to three as shown, and not all inter-segment coupling points need be hinged. In one embodiment (not shown), non-hinged coupling points are used in lieu of the hinges 126, and the compact or folding arrangement of the instrument support rack is achieved using segments that are detachable from the fixed coupling points. It should be noted that the use of hinges 126 allows adjustability between the minimum, folded position, and the maximum open position, to intermediate positions between these that are operator-selected based on comfort and preference. As detailed below, the hinges are configured to provide stable support at these intermediate positions as well as at the maximum and minimum positions.

Legs 160 are preferably vertical in the operational position (FIG. 1A), and are removably coupled to each sub-segment 124, and to the main segment 122. Different leg-segment combinations are also contemplated. Coupling in one embodiment is by way of leg brackets 128 into which the legs removably fit in a male-female coupling arrangement. An opposite, female-male coupling (not shown) is also contemplated, as are other forms of coupling, such as threaded, hinged, telescoping, or combinations thereof. In the hinged and telescoping configurations, the legs may optionally not be removable. At the opposite ends, legs 160 are each provided with a foot 162 configured to cap the leg and provide good purchase or grip on the ground support on which the rack 100 is to rest. Candidate materials for the foot 162 include natural rubber or similar materials.

Figure 1C:
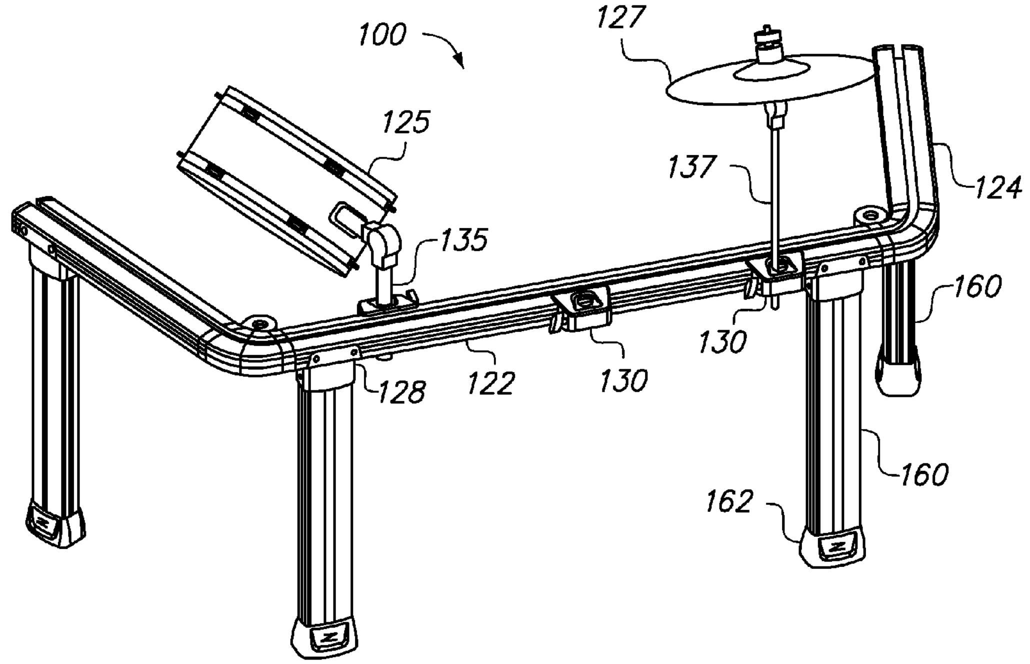
FIG. 1C is an isometric view showing the rack 100 in an operational position for use with a drum 125 and a cymbal 127.

Rack 100 also includes one or more clamps 130 configured to adjustably receive posts to which various instruments, such as drums, snares, cymbals (normal and high-hat), may be attached. The clamps 130 are selectively attached to the various segments 122, 124 in positions at which the musical instruments are desired. One exemplary method of attachment is by way of screws provided on the clamps 130, which mate into corresponding nuts disposed in desired positions in segments 122, 124, as detailed below. An alternative method is for the clamp screws to thread into predrilled holes in the segments 122, 124. FIG. 1C is an isometric view showing the rack in an operational position for use with a drum 125 and a cymbal 127. These are coupled to the rack 100 by posts 135 and 137, as detailed below.

Figure 2A:
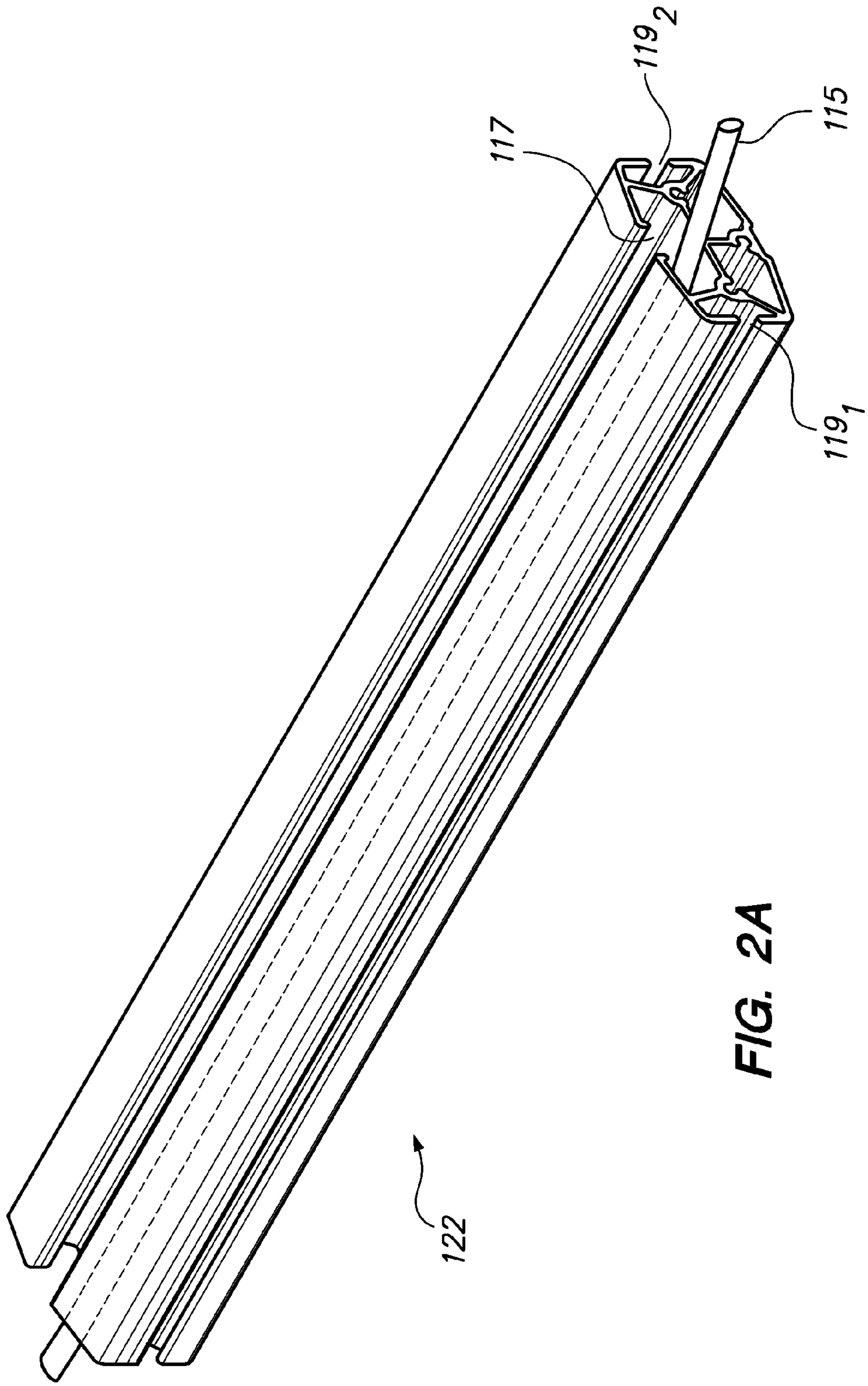
FIGS. 2A and 2B are, respectively, isometric and cross-sectional views of a portion of main segment 122 of rack 100.
Figure 2B:
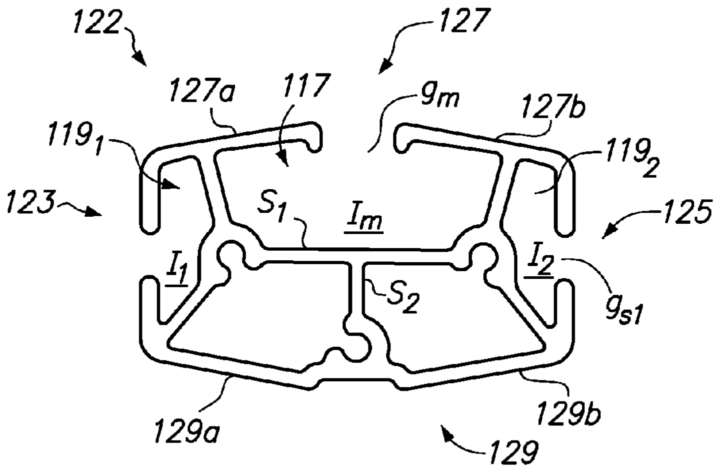

FIGS. 2A and 2B are isometric and cross-sectional views of a portion of main segment 122. In one embodiment, the main segment 122, the sub-segments 124, and the legs 140 all have the same cross-sectional shape, such as that shown in FIG. 2B. However, this is not mandatory and different cross-sectional shapes of the different components are contemplated. Main segment 122 is seen as having a main channel 117 and side channels $\mathbf{119}_1$ and $\mathbf{119}_2$. In cross-section (FIG. 2B), main segment 122 is generally hexagonal, with two minor sides 123 and 125, and two major sides 127 and 129 that are each comprised respectively of sub-sides 127*a*, 127*b* and 129*a* and 129*b*. Major side 127 is provided with a gap $g_m$ between sub-sides 127*a*, 127*b*, the gap providing access from the exterior of the segment 122 to first interior portion $I_m$ defining main channel 117. In this manner, electrical cables (115, FIG. 2A) connecting the various musical instruments to the electronic equipment, such as a controller (not shown), can be inserted through the gap $g_m$ into interior portion $I_m$ for concealment of the cables, to provide a tidier appearance. To that end, the gap $g_m$ is sized to be about the diameter of the cables 115 that are expected to be used, or slightly smaller in order to better retain them within the interior portion $I_m$.

Sub-sides 123 and 125 are also provided with gaps, $g_{s1}$ and $g_{s2}$, through which access to interior portions $I_{s1}$ and $I_{s2}$ ($I_{sx}$ collectively) defining side channels $\mathbf{119}_1$ and $\mathbf{119}_2$ is gained. As further detailed below, clamp bolts protruding from clamps 130 pass through gaps $g_{s1}$ and $g_{s2}$ ($g_{sx}$ collectively) to mate with corresponding threaded nuts disposed in interior portions $I_{s1}$ and $I_{s2}$ defining, respectively, channels $\mathbf{119}_1$ and $\mathbf{119}_2$. To improve rigidity, a pair of interior surfaces $S_1$ and $S_2$ are provided. These are joined in a T shape and appear as trusses in the cross-sectional view of FIG. 2. Suitable material for main segment 122, and, optionally, sub-segments 124 and legs 160, can be aluminum or other metals, plastic, or glass filled PC-ABS.

FIGS. 3A-3D are views of one of several clamps 130 that may be used to mount musical instruments to a segment such as main segment 122 or sub-segment 124 of musical rack 100. Clamp 130 includes a housing 131 made for example of aluminum or other metals, plastic, or glass filled PC-ABS. The housing 131 is provided with a through hole 132 for passage of a post 133 (FIG. 3C) on which a musical instrument (not shown) is mounted, typically by way of a universal joint or the like (not shown) at a distal end of the post that allows adjustment of the orientation of the instrument. The post 133 passes through top hole 132*a*, eye-bolt 134 and bottom hole 132*b*. Eye-bolt 134 is coupled to wing nut 136 by way of a threaded shaft or bolt 138, the combination configured to laterally move (arrow a) the eye-bolt 134 within clamp 130 in response to turning of the wing nut. In this manner, pressure is exerted on the instrument post 133 passing through the through hole 132 by virtue of the constraint in the lateral direction imposed by the edges of the top (132*a*) and bottom (132*b*) holes. In this manner the axial position (arrow b) of the post 133 within clamp 130 can be adjusted by the operator, as well as the rotational position, to thereby adjust the height and orientation at which the instrument is disposed. In addition, the eye-bolt arrangement permits different sized posts to be used, with the maximum post diameter being about equal to the diameter of the through hole 132. In one embodiment, the combination of the through hole 132 and eye-bolt 134 are configured so as to accommodate posts with diameters ranging from about ⅜ to 1 inch. With reference again to FIG. 1C, it can be seen that the posts 135 and 137 respectively coupling drum 125 and cymbal 127 are of different diameters but are nonetheless accommodated by the clamps 130.

Figure 3A:
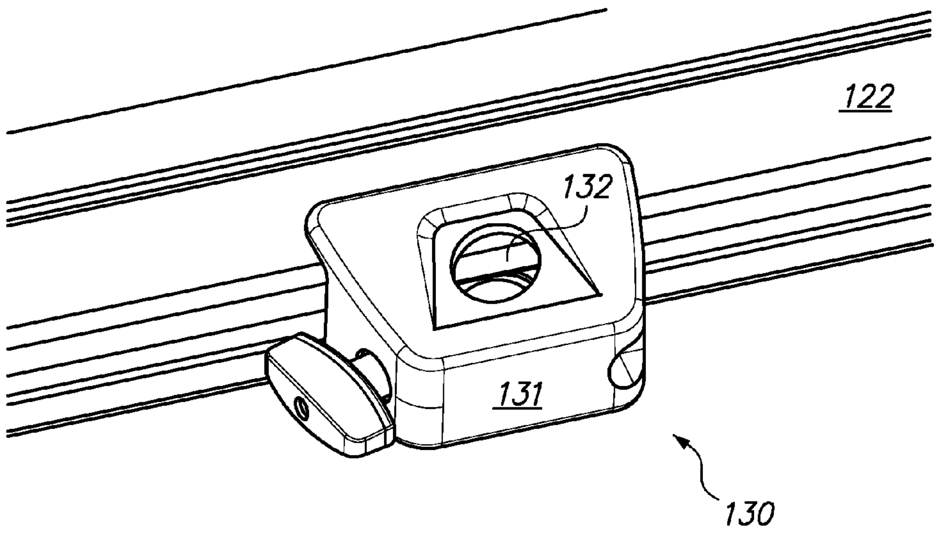
FIGS. 3A-3D are various views of one of several clamps 130 that may be used to mount musical instruments to a segment such as main segment 122 or sub-segment 124 of musical rack 100.
Figure 3B:
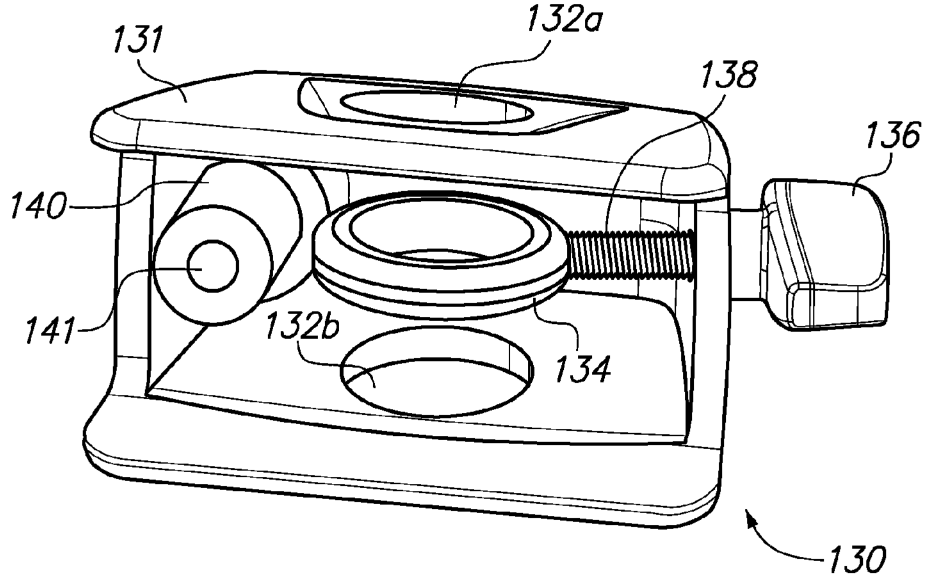
Figure 3C:
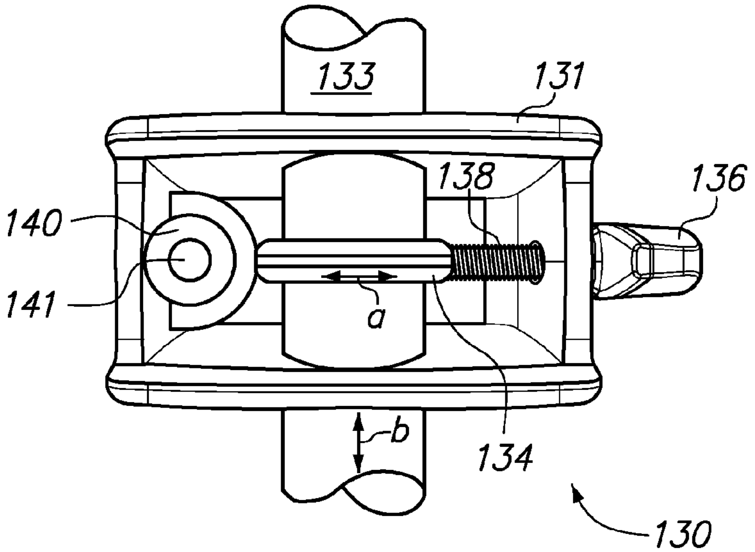
Figure 3D:
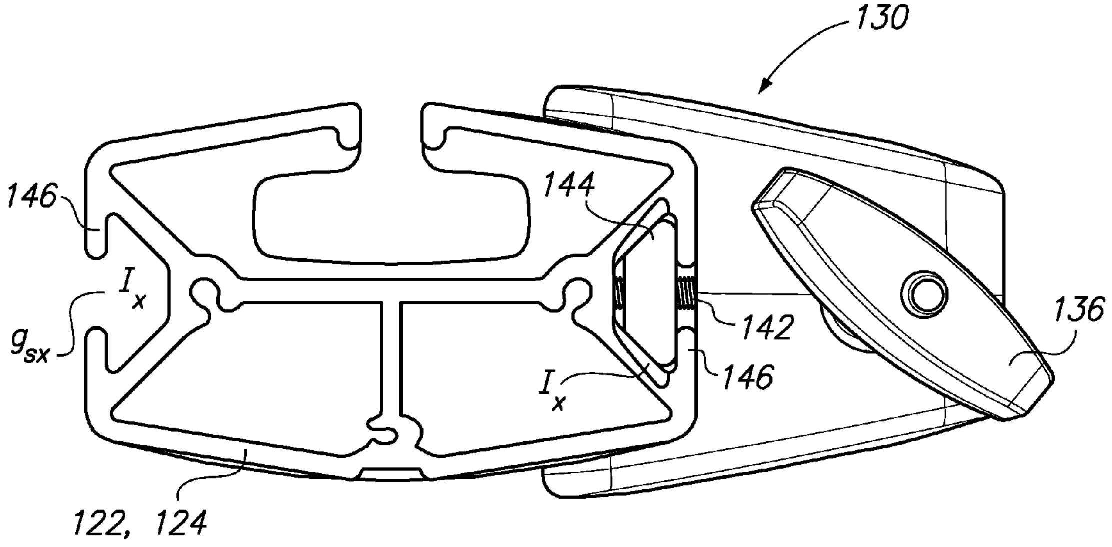

Clamp 130 is also provided with a sleeve 140 having a hole 141 for rotatably retaining a part of a fastening means, such as a screw, threaded stud or bolt 142 operative to fasten the clamp 130 to a segment 122, 124. As seen in FIG. 3D, clamp bolt 142 engages clamp 130 and passes through the gap $g_{sx}$ to threadably mate with another part of the fastening means, such as a corresponding nut 144 retained in interior portion $I_x$ defining the side channel $\mathbf{119}_1$ or $\mathbf{119}_2$ and thereby clamp the clamp 130 in position against the segment 122, 124, and, specifically, against the wall 146 thereof. Nut 144 is constrained from rotating within the side channel $\mathbf{119}_1$ or $\mathbf{119}_2$ by at least partially conforming to the shape of the interior portion $I_{sx}$. However, nut 144 is movable in one degree of freedom—axially along the length of the side channel $\mathbf{119}_1$ or $\mathbf{119}_2$—so that the axial position of the clamp 130 along the segment 122, 124, and the instrument mounted thereto, can be adjusted as desired. In an alternative embodiment, clamp bolt 142 can mate with predrilled threaded holes (not shown) provided on a confronting interior wall of interior portion $I_{sx}$.

Figure 4A:
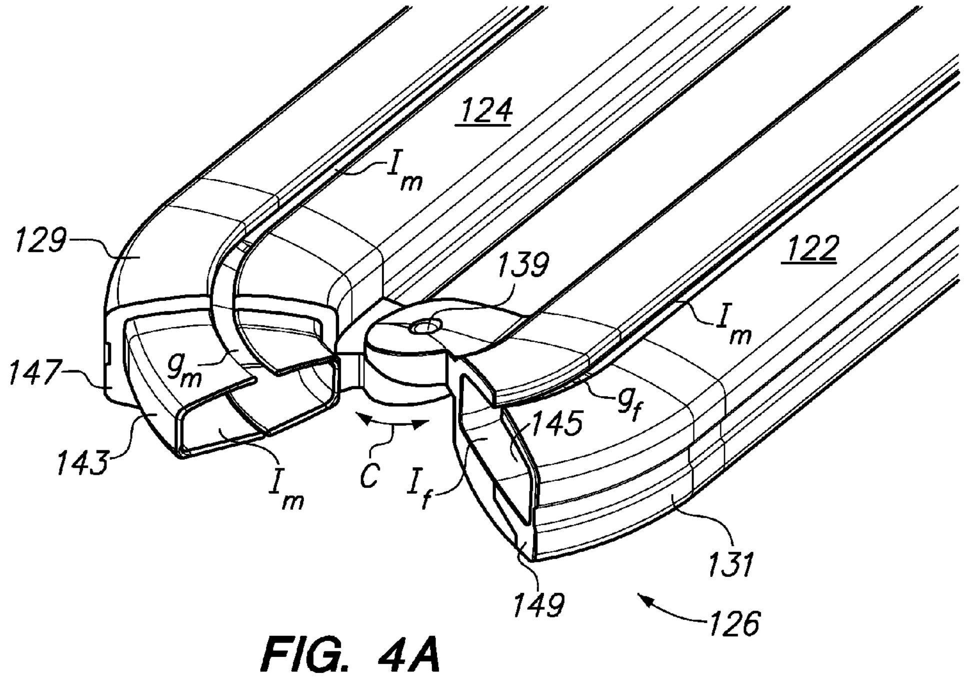
FIGS. 4A and 4B are isometric views of a hinge 126 connected to the segments 122 and 124 to achieve the rotatable coupling of the segments to one another.
Figure 4B:
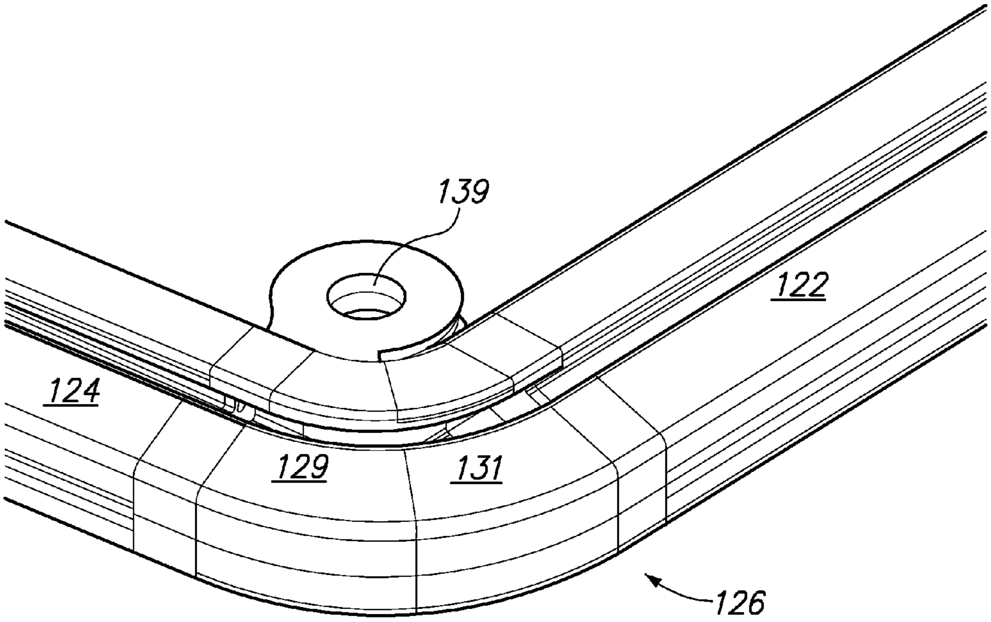

FIGS. 4A and 4B are isometric views of a hinge 126 connected to the segments 122 and 124 to achieve the rotatable coupling of the segments to one another. Connection of the hinge 126 to segments 122, 124 can be by way of means such as adhesive, pressure fitting, fasteners and the like (not shown). Hinge 126 is shown in the position corresponding to the folded rack 100 in FIG. 4A, and in the position corresponding to the opened, operational rack in FIG. 4B. Male (129) and a female (131) portions are rotatable relative to one another in the direction of arrow c about pivot point 139. Male extension 143 fits into receptacle 145 until shoulder 147 abuts edge 149, reaching the fully open position of the rack 100. The length and configuration of the male extension 143 may be selected to lend added structural support to the connection between the segments 122, 124 at the hinge 126. As previously explained, the angle formed by segments 122 and 124 in this fully open position can be selected to be between about 90° and 180°, but is preferably about 110°. Moreover, as explained above, intermediate angles, between 0° and 110° for example, can be accommodated to suit the user's (drummer's) particular preference.

Hinge 126 also includes gaps $g_1$ and $g_2$ and for accessing hinge interior portions $I_1$ and $I_2$. The gaps $g_1$ and $g_2$ are in alignment with one another when the male and female portions are mated with one another and provide access to a common interior portion formed from $I_1$ and $I_2$ when the male and female portions are mated with one another. The gaps $g_1$ and $g_2$ are in registry with the gaps $g_{s1}$ and $g_{s2}$ of the segments 122, 124, and the hinge interior portions $I_1$ and $I_2$ communicate with the interior portions $L_{s1}$ and $I_{s2}$ of the segments to define a contiguous interior space through which electrical cables can be passed.

FIGS. 5A-5D are various views of a leg bracket 128 coupling segment 122 to leg 160. Leg bracket 128 includes a segment seat 170 (FIG. 5B) configured to receive a segment 122 or 124. Seat 170 includes opposing walls 172 and 174, each having a pair of holes 176 through which a part of a fastening means, such as a bolt, screw or threaded stud 178 pass for engagement with corresponding other part of the fastening means, such as a nut 180 (FIG. 5C), that is slidably disposed within interior portions $I_{sx}$ of the segments 122, 124. The studs 178, which may be part of a wing nuts (not shown) for easy turning, engage the leg bracket 128 through holes 176 and pass through the gap $g_{sx}$ to threadably mate with nut 180 retained in interior portion $I_{sx}$ defining the side channel $\mathbf{119}_1$ or $\mathbf{119}_2$ and thereby clamp the leg bracket 128 in position against the segment 122, 124, and, specifically, against the wall 146 thereof. Nuts 180 are constrained from rotating within the side channel $\mathbf{119}_1$ or $\mathbf{119}_2$ by at least partially conforming to the shape of the interior portion $I_{sx}$. However, nuts 180 are movable in one degree of freedom—axially along the length of the side channel $\mathbf{119}_1$ or $\mathbf{119}_2$—so that the axial position of the bracket 128, and the leg 160 coupled therewith, can be adjusted as desired. In an alternative embodiment, studs 178 can mate with predrilled threaded holes (not shown) provided on a confronting interior wall of interior portion $I_{sx}$.

Figure 5A:
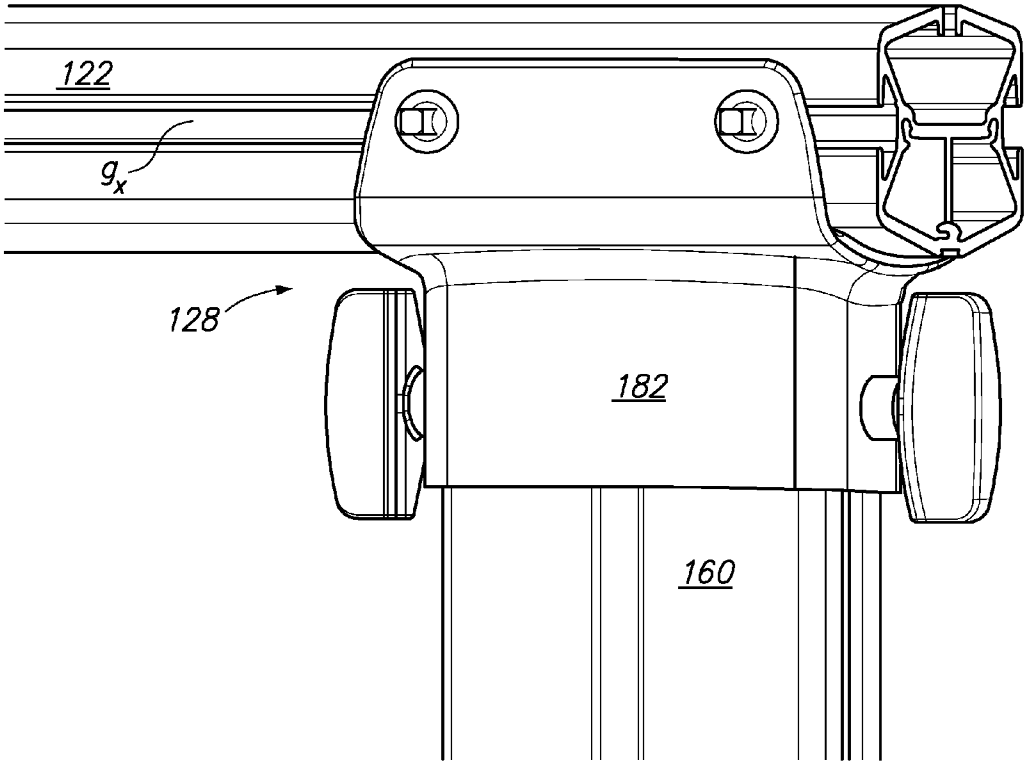
FIGS. 5A-5D are various views of a leg bracket 128 coupling segment 122 to leg 160.
Figure 5B:
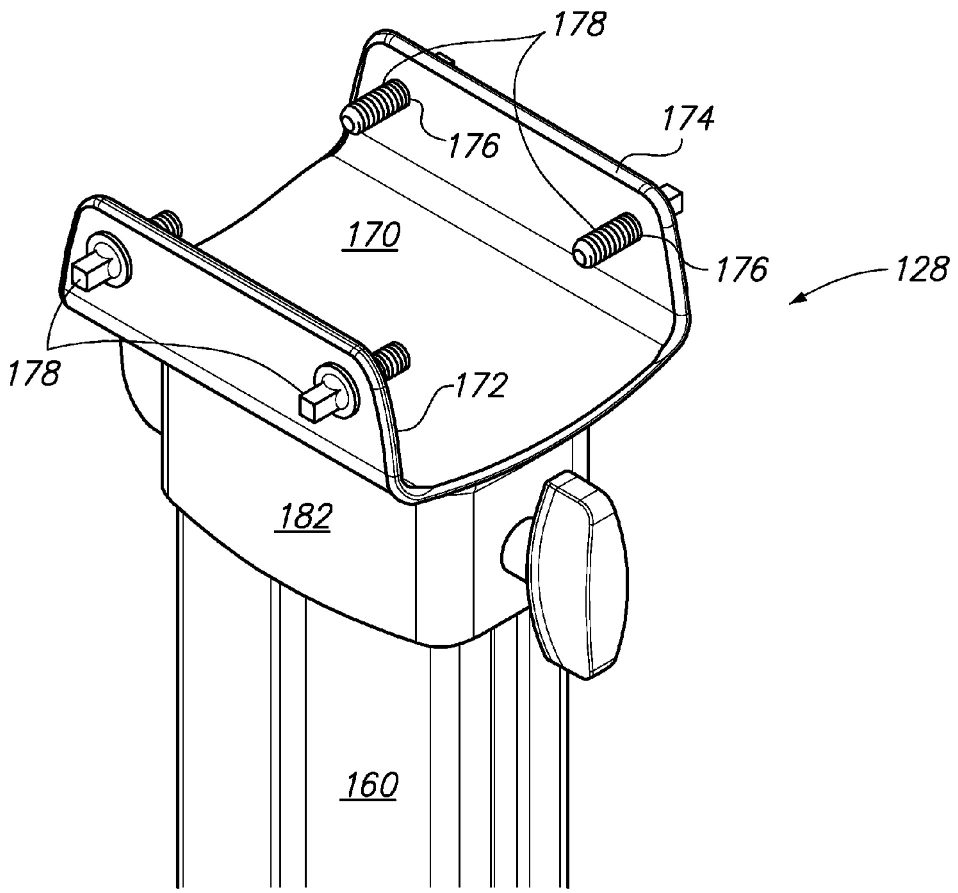
Figure 5C:
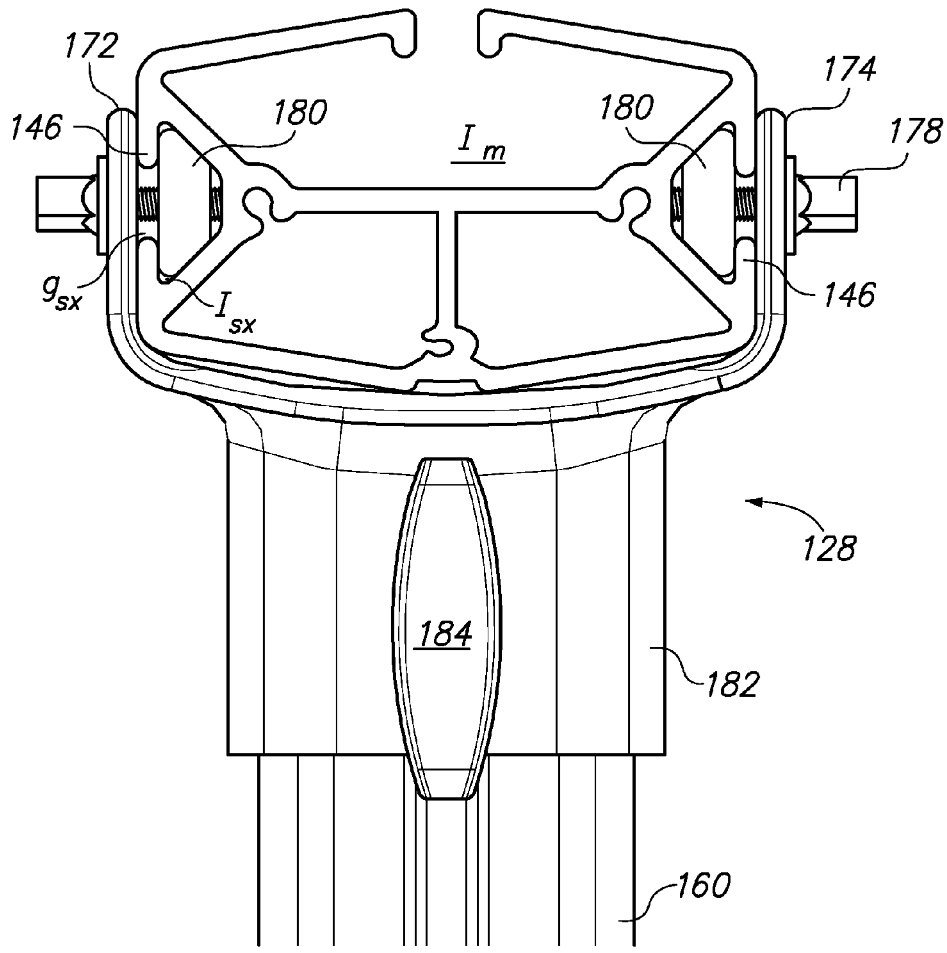
Figure 5D:
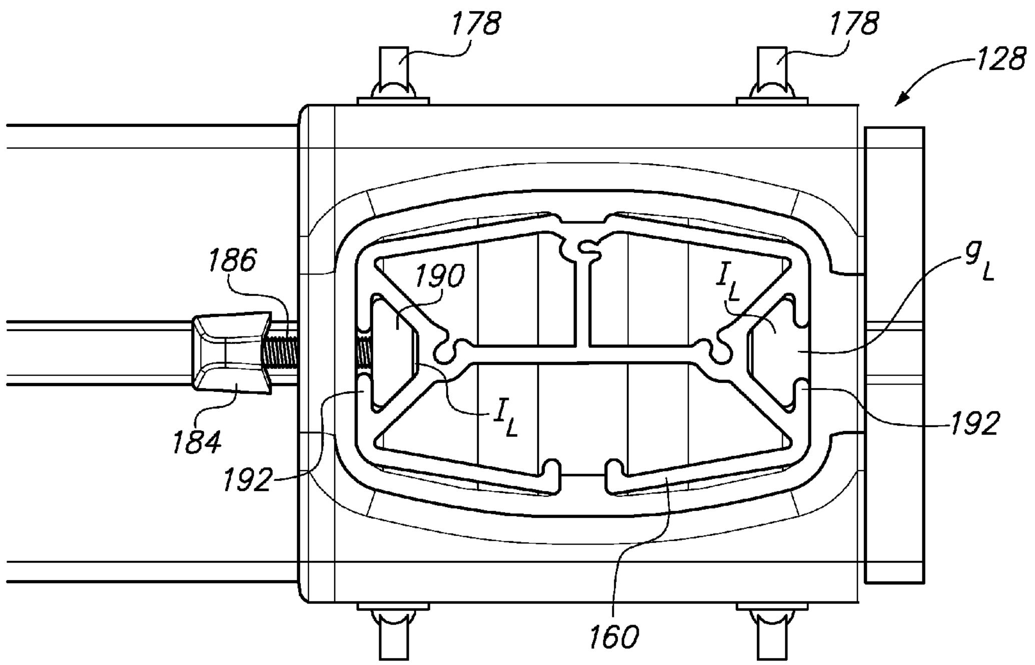

Bracket 128 also includes a cap 182 for removably receiving the top portion of leg 160. Fastening means having portions such as bolts with wing nut heads 184 and threaded shafts 186 are provided, the shafts passing through holes 188 on opposite sides of cap 182 to mate with corresponding other portions of fastening means, such as nuts 190 disposed in interior portions $I_L$, as best seen in FIG. 5D. Gaps $g_L$ provide access to the interior portions $I_L$ and nuts 190 therein. In this manner, leg 160 is clamped in position in bracket 128, against walls 192, and, because of the wing nut heads 184, can be easily removed, without tools, for efficient disassembly and compact transport and storage of the rack 100. Nuts 190 are constrained from rotating within interior portion $I_L$ by at least partially conforming to the shape of the interior portion $I_L$. It is also contemplated that the threaded shafts 186 can mate with corresponding pre-drilled holes, forming the other portion of the fastening means, provided in top portion of leg 160, in lieu of the nuts 190. Other methods for coupling clamp 128 and leg 160 together are also contemplated.

Figure 6:
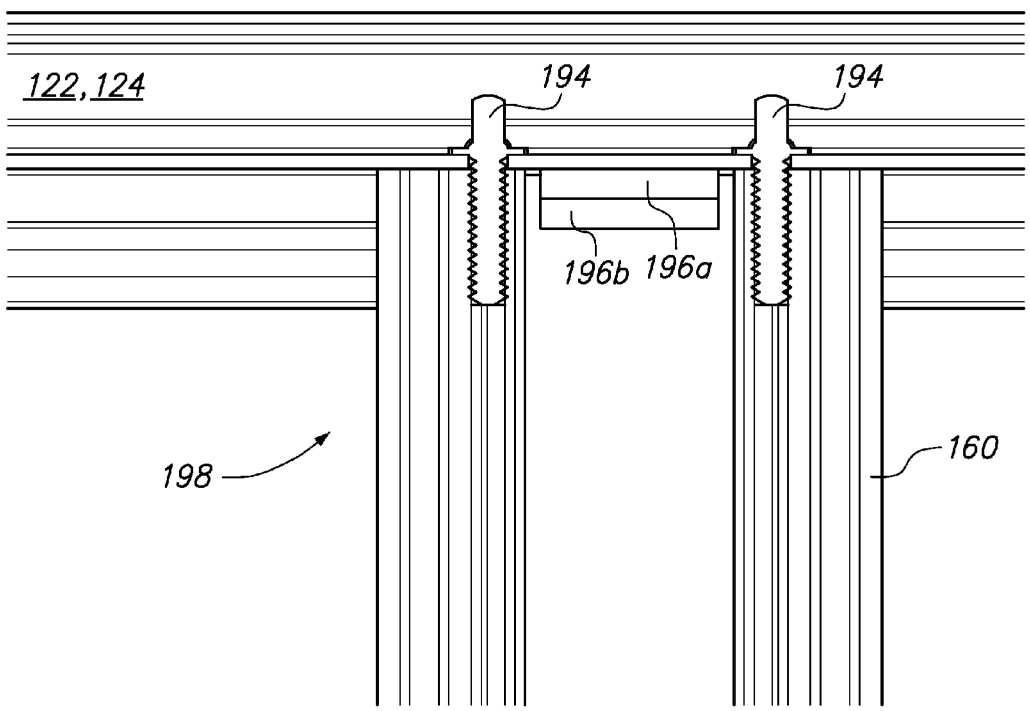
FIG. 6 is a partial cross-sectional view showing an alternative mounting arrangement using threaded bolts.

In an alternative mounting arrangement, explained with reference to FIG. 6, fasteners such as leg-mounting threaded bolts 194 are used to couple legs 160 to the respective segments 122, 124. In addition to or in lieu of bolts 194, the fasteners can take the form of one or more magnets 196*a*, 196*b*. The number of magnets will depend on the specific design and/or on the ferromagnetic properties of the materials used for the legs 160, the segments 122, 124, and/or other components such as supporting metallic plates (not shown). An appropriate cavity 198 can be formed in the segments 122, 124 to accommodate and support the legs 160 against the segments.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A foldable rack comprising:

at least two segments rotatably coupled to one another such that the foldable rack can achieve a folded configuration and an operational configuration, the folded configuration being more compact than the operational configuration, with the at least two segments being substantially parallel to one another;

a hinge operable to rotatably couple the at least two segments, the hinge having a male extension protruding from a first portion of the hinge that is rigidly coupled to one of the first or second segments, the first portion operable to pass into a female receptacle in a second portion of the hinge that is rigidly coupled to the other of the first or second segments, the first and second portions being rotatable relative to one another to separate the male extension from the receptacle in the folded configuration, and to reinforce the second portion with the male extension of the first portion in the operational configuration, said male and female portions substantially conforming in shape and abutting against each other for mutual reinforcement in the operational configuration to thereby provide structural support to the foldable rack in the operational configuration.

2. The foldable rack of claim 1, further comprising a channel provided in at least one of the at least two segments, the channel configured to constrain motion of a first part of a fastener in all but one degree of freedom.

3. The foldable rack of claim 2, wherein the constrained first part of a fastener is a nut configured to threadably receive a second part of the fastener, the first and second parts operative to couple to the segment a clamp configured to support a musical instrument.

4. The foldable rack of claim 2, wherein the constrained first part of a fastener is a nut configured to threadably receive a second part of the fastener, the first and second parts operative to couple to the segment a bracket configured to receive a leg for supporting the rack.

5. The foldable rack of claim 1, wherein the at least two segments comprise a support rail, the rack further comprising a plurality of detachable legs, each couplable to the support rail, for supporting the support rail.

6. The foldable rack of claim 5, further comprising one or more brackets that are adjustably mountable to at least one of the at least two segments in a direction along a length of the segment for receiving a corresponding leg.

7. The foldable rack of claim 6, wherein at least one bracket comprises a fastener having first and second parts, the first part at least partially conforming to a segment channel and constrained thereby for motion in all but one degree of freedom, the second part configured to pass through a portion of the bracket and mate with the first part to thereby couple the bracket to the segment.

8. The foldable rack of claim 5, further including at least one fastener for coupling at least one detachable leg to the support rail.

9. The foldable rack of claim 8, wherein the at least one fastener includes a one or more threaded bolts.

10. The foldable rack of claim 8, wherein the at least one fastener includes one or more magnets.

11. The foldable rack of claim 1, further comprising one or more clamps that are adjustably mountable to a segment in a direction along a length of the segment.

12. The foldable rack of claim 11, wherein at least one clamp includes a fastener having first and second parts, the first part at least partially conforming to a segment channel and constrained thereby for motion in all but one degree of freedom, the second part configured to pass through a portion of the bracket and mate with the first part to thereby couple the bracket to the segment.

13. The foldable rack of claim 11, wherein at least one clamp includes a through hole and an eye-bolt cooperative therewith to adjustably retain a post on which a musical instrument is supportable.

14. The foldable rack of claim 13, wherein the through hole and eye-bolt are operable to adjustably retain posts of various diameters.

15. The foldable rack of claim 1, wherein the at least two segments are provided with channels, and wherein the hinge has an interior portion that, in the operational position of the rack, communicates with the channels.

16. The foldable rack of claim 1, wherein at least one of the segments includes a main channel configured to receive an electric cable for concealment thereof.

17. A foldable rack comprising:

first and second segments, at least one of which includes at least one side channel configured to constrain motion of a first fastener part in all but one degree of freedom;

a hinge rotatably coupling the first and second segments between a folded configuration and an open configuration, with the first and second segments being substantially parallel to one another in the folded configuration, the hinge having a male extension protruding from a first portion of the hinge that is rigidly coupled to one of the first or second segments, the first portion operable to pass into a female receptacle in a second portion of the hinge that is rigidly coupled to the other of the first or second segments, the first and second portions being rotatable relative to one another to separate the male extension from the receptacle in the folded configuration, and to reinforce the second portion with the male extension of the first portion in the open configuration, said male and female portions substantially conforming in shape and abutting against each other for mutual reinforcement in the operational configuration to thereby provide structural support to the foldable rack in the operational configuration; and a plurality of legs configured to support the first and second segments in the open configuration.

18. The foldable rack of claim 17, further comprising a bracket engageable by a second fastener part configured to mate with the first fastener part to thereby couple the bracket to a segment that includes the at least one side channel.

19. The foldable rack of claim 18, wherein the bracket includes a cup for removably receiving a leg.

20. The foldable rack of claim 19, wherein the leg is releasably securable to the bracket by way of a threaded shaft configured to mate with a corresponding nut constrained in a channel of the leg.

21. The foldable rack of claim 17, further comprising a clamp engageable by a second fastener part configured to mate with the first fastener part to thereby couple the clamp to a segment that includes the at least one side channel.

22. The foldable rack of claim 21, wherein the clamp includes a through hole and an eye-bolt cooperative therewith to adjustably retain a post on which a musical instrument is supportable.

23. The foldable rack of claim 17, wherein at least one of the segments includes a main channel configured to receive an electric cable for concealment thereof.

24. The foldable rack of claim 17, further including at least one fastener for coupling at least one of the plurality of legs to one of the first or second segments.

25. The foldable rack of claim 24, wherein the at least one fastener includes one or more threaded bolts.

26. The foldable rack of claim 24, wherein the at least one fastener includes one or more magnets.

* * * * *